W. PETER.
TONGS.
APPLICATION FILED JAN. 6, 1913.
1,076,839. Patented Oct. 28, 1913.
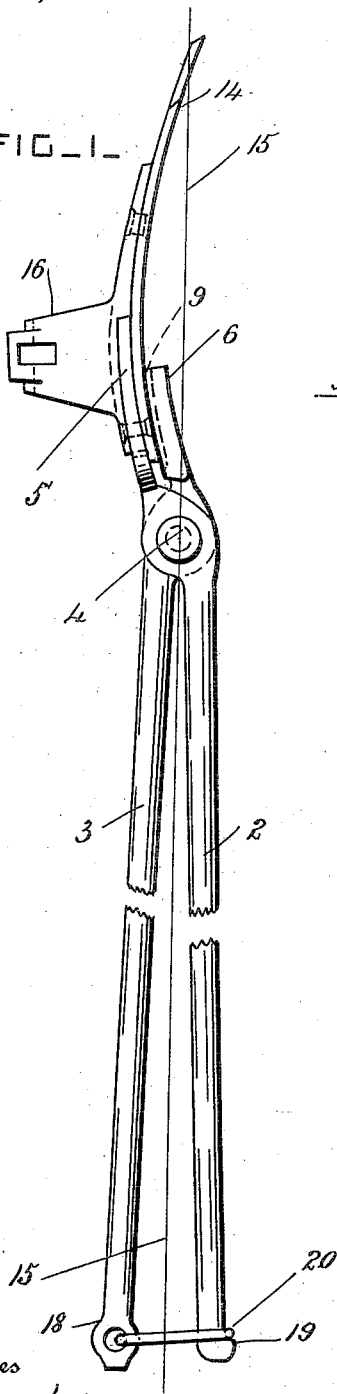
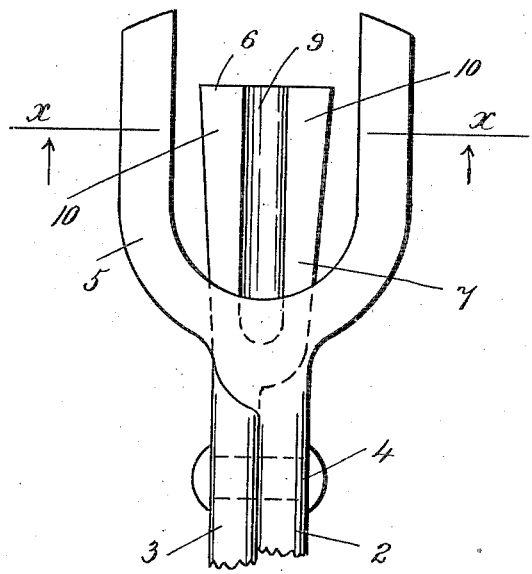
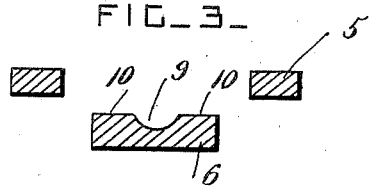
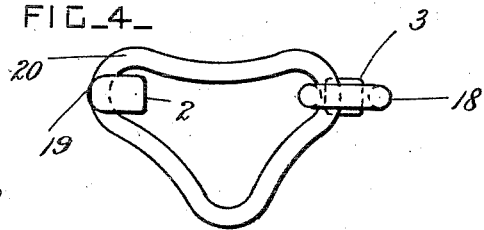
Witnesses
Inventor
Wilhelm Peter,
By Herbert W. Jenner.
Attorney

UNITED STATES PATENT OFFICE.

WILHELM PETER, OF DEGRAFF, OHIO.

TONGS.

1,076,839.  Specification of Letters Patent.  Patented Oct. 28, 1913.

Application filed January 6, 1913. Serial No. 740,421.

*To all whom it may concern:*

Be it known that I, WILHELM PETER, a citizen of the United States, residing at Degraff, in the county of Logan and State of Ohio, have invented certain new and useful Improvements in Tongs; and I do hereby declare the following to be a full, clear, and exact description of the invention, such as will enable others skilled in the art to which it appertains to make and use the same.

This invention relates to tongs specially intended for the use of blacksmiths and for the purpose of holding curved cultivator shovels or blades having fastening brackets riveted to them; and it consists of a pair of crossed and pivoted handles provided with specially constructed jaws and a clamping link as hereinafter fully described and claimed.

In the drawings, Figure 1 is a side view of a pair of tongs constructed according to this invention, and showing also a cultivator shovel. Fig. 2 is a plan view of the jaws, from below, drawn to a larger scale. Fig. 3 is a cross-section through the jaws, taken on the line $x$—$x$ in Fig. 2. Fig. 4 is a detail view of the clamping link.

The tongs have crossed and pivoted handles 2 and 3 which work on the rivet or pivot 4. The handle 2 has a forked or U-shaped jaw 5, and the jaw 6 pertaining to the handle 3 is a plate one side portion 7 of which is offset laterally from the handle so that the plate is arranged midway of the forked jaw 5 which is opposed to it. The plate jaw 6 has a longitudinal groove 9 in its face so that two bearing surfaces 10 are formed at its side portions. Both jaws are curved slightly, to correspond with the curvature of the blade 14 of the shovel, and both jaws are arranged at an angle to the general direction of the handles so that a straight line 15 drawn between the handles and through the pivot may touch the blade near its point. The forked jaw straddles the holder bracket 16 on the back of the blade, and the bearing surfaces 10 bear on the front of the blade. When the shovel is held in this manner it can be sharpened or otherwise worked on by a blacksmith with great facility.

In order to clamp the shovel in the jaws, one handle 3 has an eye 18 at its free end, and the other handle has a projection 19. A substantially triangular link 20 is pivoted loosely in the eye 18, and its sides are all of unequal length, so that it can be turned around in the eye and used to clamp three blades of different thickness. The spring of the handles enables the jaws to be clamped upon blades of various thickness between the three sizes specially provided for. The sides of the link are curved inwardly, and the angles are rounded so as to engage with the handle 2 close behind the projection 19 over which the link is sprung.

What I claim is:

1. A pair of tongs for holding a curved cultivator shovel provided with a holder bracket, said tongs comprising crossed and pivoted handles, one handle having a forked jaw adapted to straddle the holder bracket, and the other handle having a plate which is narrower than the fork of the jaw and provided with a longitudinal groove in its face, both jaw and plate being curved in the same direction and arranged parallel to and opposite to each other so as to engage with the curved shovel and being both offset to one and the same side of the center line of the handles.

2. The combination, with a pair of tongs provided with crossed and pivoted handles and opposed jaws, of a triangular link having sides of unequal length, said link being pivoted to one handle and adapted to engage with the other handle, and free to be turned around so as to clamp objects of different thickness between the jaws.

In testimony whereof I have affixed my signature in the presence of two witnesses.

WILHELM PETER.

Witnesses:
 AMANDA HONE,
 CHRISTIAN R. PETER.